(12) United States Patent
Komatsu et al.

(10) Patent No.: US 6,808,829 B2
(45) Date of Patent: Oct. 26, 2004

(54) IMAGE-DISPLAY DEVICE

(75) Inventors: Masaaki Komatsu, Kokubunji (JP);
Masatoshi Shiiiki, Musashimurayama (JP); Shin Imamura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/276,917

(22) PCT Filed: Aug. 20, 2001

(86) PCT No.: PCT/JP01/07112

§ 371 (c)(1),
(2), (4) Date: Nov. 22, 2002

(87) PCT Pub. No.: WO02/061014

PCT Pub. Date: Aug. 8, 2002

(65) Prior Publication Data

US 2003/0164670 A1 Sep. 4, 2003

(30) Foreign Application Priority Data

Jan. 30, 2001 (JP) .................... 2001-021608

(51) Int. Cl.[7] .................... H05B 33/14; C09K 11/00
(52) U.S. Cl. .................... 428/690; 252/301.4 R; 252/301.65; 252/301.45; 313/467; 313/468; 313/483; 313/486; 313/496; 313/503; 313/385; 313/463; 428/917; 428/704; 428/698
(58) Field of Search ............ 252/301.4 R, 301.65, 252/301.45; 313/467, 468, 483, 486, 503, 385, 463, 496; 428/690, 917, 704, 698

(56) References Cited

U.S. PATENT DOCUMENTS 6,077,458 A * 6/2000 Shiiki et al. ......... 252/301.4 R

FOREIGN PATENT DOCUMENTS

| JP | 49-30284 | 7/1972 |
|----|----------|--------|
| JP | 56-84849 | 12/1979 |
| JP | 3-207786 | 1/1990 |
| JP | 4-4287 | 4/1990 |
| JP | 4-11687 | 4/1990 |
| JP | 6-299149 | 4/1993 |
| JP | 6-322364 | 5/1993 |
| JP | 11-349937 | 6/1998 |
| JP | 2000-136381 | 7/1999 |

OTHER PUBLICATIONS

Japanese Search Report for PCT/JP01/07112 dated Nov. 20, 2001.

Arthur L. Smith, :Zinc–Magnesium Oxide and Zinc–Magnesium Sulfide Phosphors, Journal of the Electrochemical society (Apr. 1952), vol. 99, No. 4, pp. 155–158.

J. W. Brightwell, B. Ray and S. White, "Phase Structure of $Zn_{1-x}Mg_xS$ Prepared by reaction of Mixed Chlorides with $H_2S$", Journal of Materials Science Letters 3 (1984) pp. 955–958.

* cited by examiner

*Primary Examiner*—Deborah Jones
*Assistant Examiner*—Ling X Xu
(74) *Attorney, Agent, or Firm*—Reed Smith LLP; Stanley P. Fisher, Esq.; Juan Carlos A. Marquez, Esq.

(57) ABSTRACT

An image-display device using phosphor can improve the its luminescence efficiency and characteristics of color coordinates by adding an IIA element to a host crystal of ZnS phosphor to form a composite crystal. The image-display device improves the luminescence efficiency and color coordinate characteristics by using a phosphor expressed by Zn(1-x)MIIAxS:MIB, MIII where MIIA is one or more IIA elements in periodic table of elements, MIB is one or more IB elements and MIII is one or more MIIIA elements such as Sc or Y.

21 Claims, 13 Drawing Sheets

IMAGE-DISPLAY DEVICE

TECHNICAL FIELD

The present invention relates to an image-display device having a faceplate formed with a phosphor layer and means irradiating an electron beam to the phosphor layer. More specifically, the present invention relates to an image-display device using, as a phosphor forming a phosphor layer, a ZnS phosphor having an improved luminescence efficiency.

BACKGROUND ART

At present, high resolution and large-screen display devices are being studied and developed increasingly in image information systems. Displaying a sharp image on a large screen is desired strongly to color display devices. The luminescence efficiency and color coordinates of display devices must be improved.

ZnS phosphors are used as a green luminescence phosphor and a blue luminescence phosphor for a cathode-ray tube such as a color picture tube or a color display tube and are a typical phosphor material used as a blue luminescence phosphor in a projection Braun tube. From the request to the display devices, the performance of the ZnS phosphors is required to be further improved.

To improve the luminescence efficiency and color coordinates, improvement in phosphor material composition and development of phosphor particle surface treatment methods have been performed. As a method for using a ZnMgS phosphor which is made into a compound crystal by adding Mg as a IIA element to ZnS, Japanese Published Unexamined Patent Application No. Hei 3-207786 reports ZnMgS:$Pr^{3+}$ for an EL luminescence element. MgS is solid solved into ZnS using a high purity Mg metal, thereby facilitating incorporation of $Pr^{3+}$ into a crystal.

Japanese Published Unexamined Patent Application No. Hei 6-299149 reports a ZnS:Ag phosphor provided on its surface with a barrier layer ZnMgS so as not to move carriers onto a surface layer having a large proportion of non-radiative recombination center.

J. Electrochem. Soc. 99 (1952) 155 reports a shift in short wave length of a luminescence spectrum by Mg under electron beam excitation in the range of Mg=5–30 mol % for ZnMgS:Cu,Cl and ZnMgS:Ag,Cl phosphors.

A Cl compound is used as a flux at phosphor synthesis. Green luminescence and SA luminescence (self-activate luminescence) as the cause of cross contamination are observed in the ZnMgS:Cu,Cl phosphor. The luminescence efficiency of the Cu and Ag activate phosphors has not been improved.

In a technical field entirely different from the phosphor, as a studied result of a crystal structure, J. Materials. Science 3 (1984) 951 reports lattice expansion in a MgS–ZnS compound crystal form due to increased Mg, change from a cubic form to a hexagonal form of a crystal structure at below 1020° C., and limit of solid solution of MgS to ZnS.

As a novel phosphor manufacturing method, for the ZnS:Cu,Al phosphor, as in Japanese Published Unexamined Patent Application No. Hei 4-11687, there is a method for obtaining a phosphor of resistance to high electron beam excitation and high luminescence by specifying the mol ratio of Cu and Al as an activator.

As a method for using a hexagonal form ZnS phosphor, for the ZnS:Ag,Al phosphor, as in Japanese Published Unexamined Patent Application No. Hei 6-322364, there is a method for improving the luminescence tone and linearity by mixing a cubic form and a hexagonal form.

There is a method for obtaining a blue luminescence phosphor whose luminescence and electric current characteristics are improved to some extent using a hexagonal form of ZnS:Ag,M,Al phosphor (M is Cu or Au), as in Japanese Published Unexamined Patent Application No. Hei 11-349937.

To improve the luminescence efficiency of the ZnS phosphor, various methods have been studied. These prior art methods, however, cannot solve all the problems. In particular, in the green luminescence ZnS:Cu,Al and the blue luminescence ZnS:Ag,Al phosphors, Cu and Ag of a IB element added as radiative recombination center enter into an interstitial site without Zn site substitution to cause high energy luminescence such as Blue-Cu. It is one factor color un-coordinating green luminescence and inhibiting improvement in luminescence efficiency.

An object of the present invention is to provide an image-display device having an excellent luminescence characteristic by improving a luminescence energy efficiency and color coordinates by cathode-ray tube excitation which is the problem of the above prior art ZnS phosphor.

DISCLOSURE OF THE INVENTION

The above object is achieved by an image-display device having a faceplate formed with a phosphor layer, and means irradiating an electron beam to the phosphor layer, including: the phosphor layer consisting of a ZnS phosphor which is expressed by a general formula: Zn(1–x)MIIAxS:MIB, MIII where MIIA is at least one IIA element selected from the group of Be, Mg, Ca, Sr and Ba; MIB is at least one IB element selected from the group of Cu, Ag and Au; MIII is a III element including at least one of Al and Ga; and a solubility x is 0<x<0.25.

As one aspect of the ZnS phosphor used in the image-display device of the present invention, the ZnS host crystal lattice is expanded so that at least one IB element selected from the group of Cu, Ag and Au as the radiative recombination center (activator) facilitates Zn site substitution.

The Cu covalent radii r=0.135 nm and the Ag covalent radii r=0.152 nm are both larger than the Zn covalent radii r=0.131 nm. It is desirable to expand the host crystal lattice of the ZnS phosphor in order to improve the luminescence efficiency by increasing an amount of the IB element added to enhance the radiative recombination center density.

In the present invention, to expand the host crystal lattice, at least one IIA element selected from the group of Be, Mg, Ca, Sr and Ba is added in a suitable amount to ZnS.

In the case of Mg, the ion bonding properties are strong and the ionic radii are r=0.071 nm to be smaller than the Zn ionic radii r=0.074 nm. The host crystal lattice of ZnMgS as a compound crystal of ZnS and MgS is expanded as compared with ZnS. For example, when Mg is 30 mol %, it is expanded by about 0.005 nm in the a axis direction and by about 0.003 nm in the c axis direction. For the ionic radii of other IIA elements, Be: 0.034 nm; Ca: 0.106 nm; Sr: 0.127 nm; and Ba: 0.143 nm. Ca and Sr have the effect for singly expanding the ZnS lattice as in Mg.

When the different IIA elements are combined to be used, the lattice can also be expanded. A ZnMgCaS host crystal lattice having a combination of Mg and Ca and a ZnBeSrS host crystal lattice having a combination of Be and Sr are taken as an example.

The ionic radii of Be are much smaller than the Zn ionic radii and the ionic radii of Ba are too large. When incorporating the elements, they are desirably combined with at least one element of Mg, Ca and Sr for co-existence.

The solubility x of Zn and at least one IIA element selected from the group of Be, Mg, Ca, Sr and Ba is 0<x<0.25. Even when the lower limit value is small, it is found to improve the luminescence efficiency. It is preferably x=0.0001 or above.

The upper limit is x<0.25. The upper limit of the solubility x is different depending on the type of at least one IB element selected from the group of Cu, Ag and Au. With the large ionic radii one like Au, the upper limit is increased. It is also different depending on the calcination temperature of the phosphor. When the calcination temperature is increased, the allowable upper limit of the x value tends to be large.

MIII used as a co-activator is a III element including at least one of Al and Ga. Addition of In, Sc and Y as other III elements is allowable.

The Zn(1-x)MgxS phosphor obtained by adding Mg, one of IIA elements, to the host crystal can easily synthesize the phosphor of a crystal structure expressed by a composition formula $\alpha_a \beta_{(1-a)}$ as compared with the prior art. $\alpha$ expresses a hexagonal form, $\beta$ expresses a cubic form, and a expresses a solubility.

In the prior art, such compound crystal form is subjected to only temperature control. ZnS is transited in the narrow temperature range around about 1020° C. In this case, since the solubility is changed by a slight temperature difference, it is difficult to synthesize a phosphor having a fixed solubility a. When using Zn(1-x)MgxS as a compound crystal with Mg, the compound crystal range of $\alpha$ and $\beta$ is large. The Mg solubility x and calcination temperature T are determined to synthesize the phosphor having a fixed solubility a more easily than the prior art.

The bandgap of the hexagonal form ($\alpha$) is about 0.1 eV larger than the Cubic form ($\beta$). The solubility a is changed in the range of 0<a <1 to select the luminescence color coordinates of the phosphor.

The Zn(1-x)MgxS changes the solubility x to vary the luminescence color coordinates of the phosphor. Mg is added to the host crystal to increase the bandgap. The solubility x of the Zn(1-x)MgxS is determined to easily select the color coordinates.

BEST MODE FOR CARRYING OUT THE INVENTION

Figure 1:
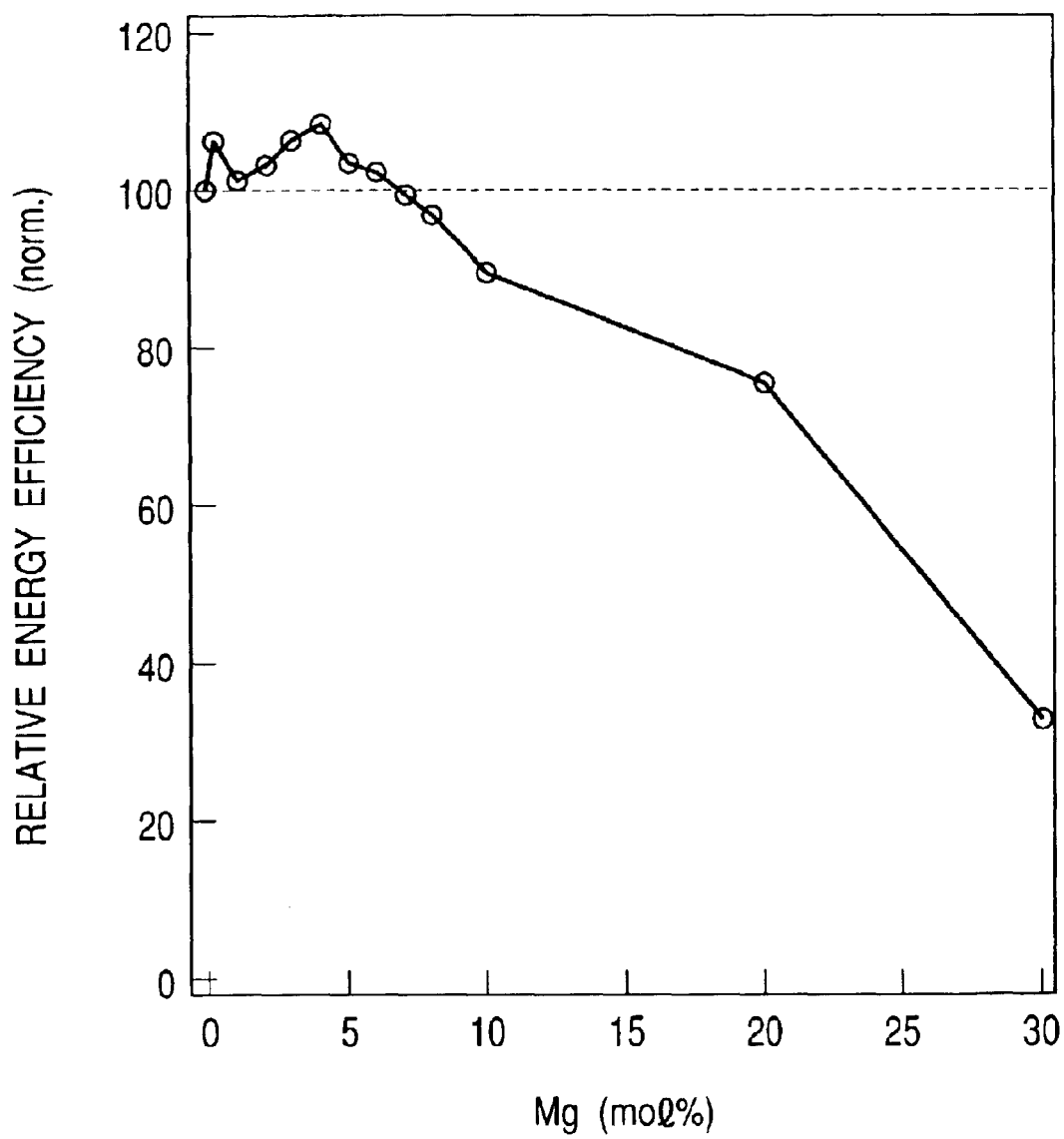
FIG. 1 is a graph showing change in Mg amount to a relative energy efficiency of a phosphor of the present invention.

A method for manufacturing a phosphor used in an image-display device of the present invention and characteristics such as a luminescence characteristic will be described here in detail. Embodiments described below show an example embodying the present invention and do not constrain the present invention.

(Embodiment 1)

A Zn(1-x)MgxS:Cu,Al phosphor applied to the present invention can be manufactured by the method described below. ZnS (zinc sulfide raw powder) and MgS (magnesium sulfide raw powder) are used as a raw host material.

As Cu used as an activator, $CUSO_4.5H_2O$ is dissolved into pure water to prepare a 10–4 mol/ml solution, which is then added in a predetermined amount. As Al used as a co-activator, $Al(NO_3)_3.9H_2O$ is dissolved into pure water to prepare a 10–4 mol/ml solution, which is then added in a predetermined amount. The quantities of the respective raw materials of a $Zn_{0.99}Mg_{0.01}S$:Cu,Al phosphor (Cu=100 weight ppm and Al=100 weight ppm) having 1 mol % Mg are as follows:

| zinc sulfide raw powder | ZnS | 9.649 g |
| magnesium sulfide raw powder | MgS | 0.056 g |
| copper solution | Cu | 0.153 ml |
| aluminum solution | Al | 0.361 ml |

The above raw materials are well mixed and dried. The obtained phosphor raw material mixture is filled into a silica boat to be set into a silica tube of a tube-like synthesis furnace for calcination. After substitution of the entire product by an Ar gas, an $H_2S$ gas of 100 ml/min is flowed into the silica tube to conduct the calcination in a hydrogen sulfide atmosphere. The calcination temperature is 950° C. and the calcination time is 2 hours. The calcined product is lightly loosened for sieving, thereby obtaining the phosphor used in the present invention.

The Zn(1-x)MgxS:Cu,Al phosphors (x=0.0001, 0.001, 0.01, 0.02, 0.03, 0.04, 0.05, 0.06, 0.07, 0.08, 0.10, 0.20, 0.30) are manufactured to be changed so that the ratio of ZnS and MgS is a predetermined amount to be synthesized as described above.

The ZnS:Cu,Al phosphor for comparison is manufactured under the conditions except for MgS. Cu and Al added as the radiative recombination center are 100 weight ppm as in the above conditions.

The luminescence characteristics of the phosphors thus obtained are evaluated by electron beam irradiation under the conditions of an accelerating voltage of 27.5 kV, an irradiating current of 0.25 $\mu A/cm^2_1$ and a sample temperature of 20° C. The results are shown in Table 1. In the luminescence characteristic, the Mg solubility x is 0<x<0.07 which is good and in particular, is 0<x<0.05 which is excellent.

TABLE 1

Luminescence characteristics of Zn (1 − x) MgxS:Cu, Al phosphors

| Mg solubility x | Relative energy efficiency E | Linearity γ | Color coordinate y value | Color coordinate x value |
|---|---|---|---|---|
| 0 | 100 | 0.97 | 0.60 | 0.30 |
| 0.0001 | 102 | 0.97 | 0.60 | 0.30 |
| 0.001 | 106 | 0.96 | 0.60 | 0.30 |
| 0.01 | 102 | 0.97 | 0.59 | 0.29 |
| 0.02 | 103 | 0.95 | 0.57 | 0.25 |
| 0.03 | 106 | 0.95 | 0.56 | 0.24 |
| 0.04 | 108 | 0.94 | 0.54 | 0.22 |
| 0.05 | 104 | 0.94 | 0.52 | 0.21 |
| 0.06 | 102 | 0.95 | 0.54 | 0.22 |
| 0.07 | 100 | 0.93 | 0.53 | 0.21 |
| 0.08 | 97 | 0.92 | 0.52 | 0.21 |
| 0.10 | 90 | 0.93 | 0.50 | 0.20 |
| 0.20 | 76 | 0.89 | 0.46 | 0.19 |
| 0.30 | 32 | 0.83 | 0.39 | 0.18 |

FIG. 1 shows change in Mg solubility to a relative energy efficiency of luminescence by electron beam irradiation of the Zn(1−x)MgxS:Cu,Al phosphor. As shown in FIG. 1, the relative energy efficiency of luminescence is high when Mg is 0–7 mol % (0<x<0.07), specifically, 0.0001–0.06. When Mg is 0.1 mol % (x=0.001), the relative energy efficiency of luminescence is 6% higher. When Mg is 4 mol % (x=0.04), the relative energy efficiency of luminescence is 8% higher.

Figure 2:
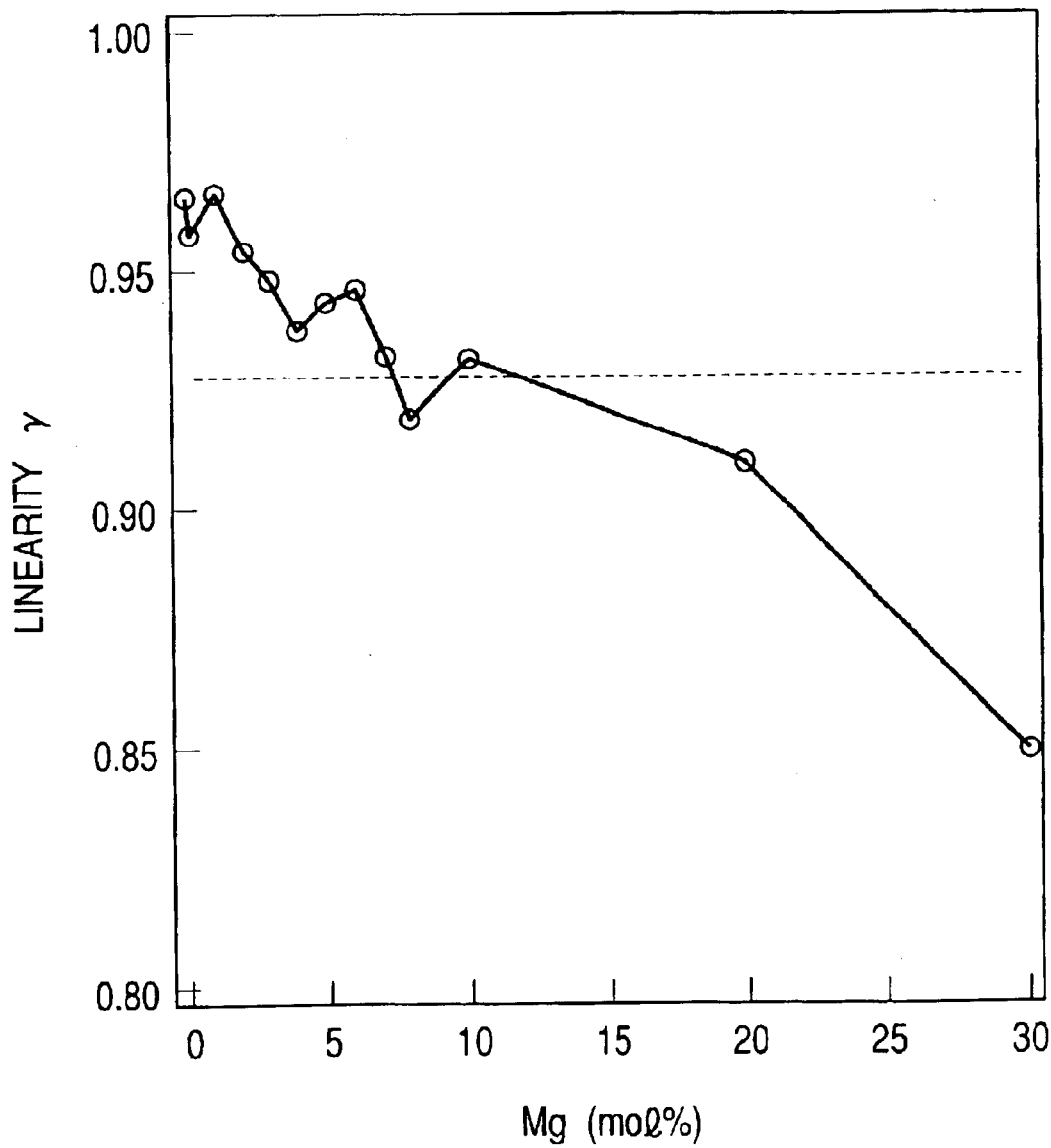
FIG. 2 is a graph showing change in Mg amount to a linearity of the phosphor of the present invention.

FIG. 2 shows change in Mg solubility to a linearity γ as the inclination of both logarithmic graphs to an irradiating current value of the energy efficiency of luminescence. The linearity γ indicates an increase to the irradiating current value of the luminescence efficiency. As it is close to γ=1.0, the increase is large. The magnitude has desirably a performance above 0.90 from the viewpoint of the practical use level used in the image-display device. This linearity γ tends to be large such that γ≧=0.93 is in the range that Mg is 0–10 mol % (0<x<0.10).

Figure 3:
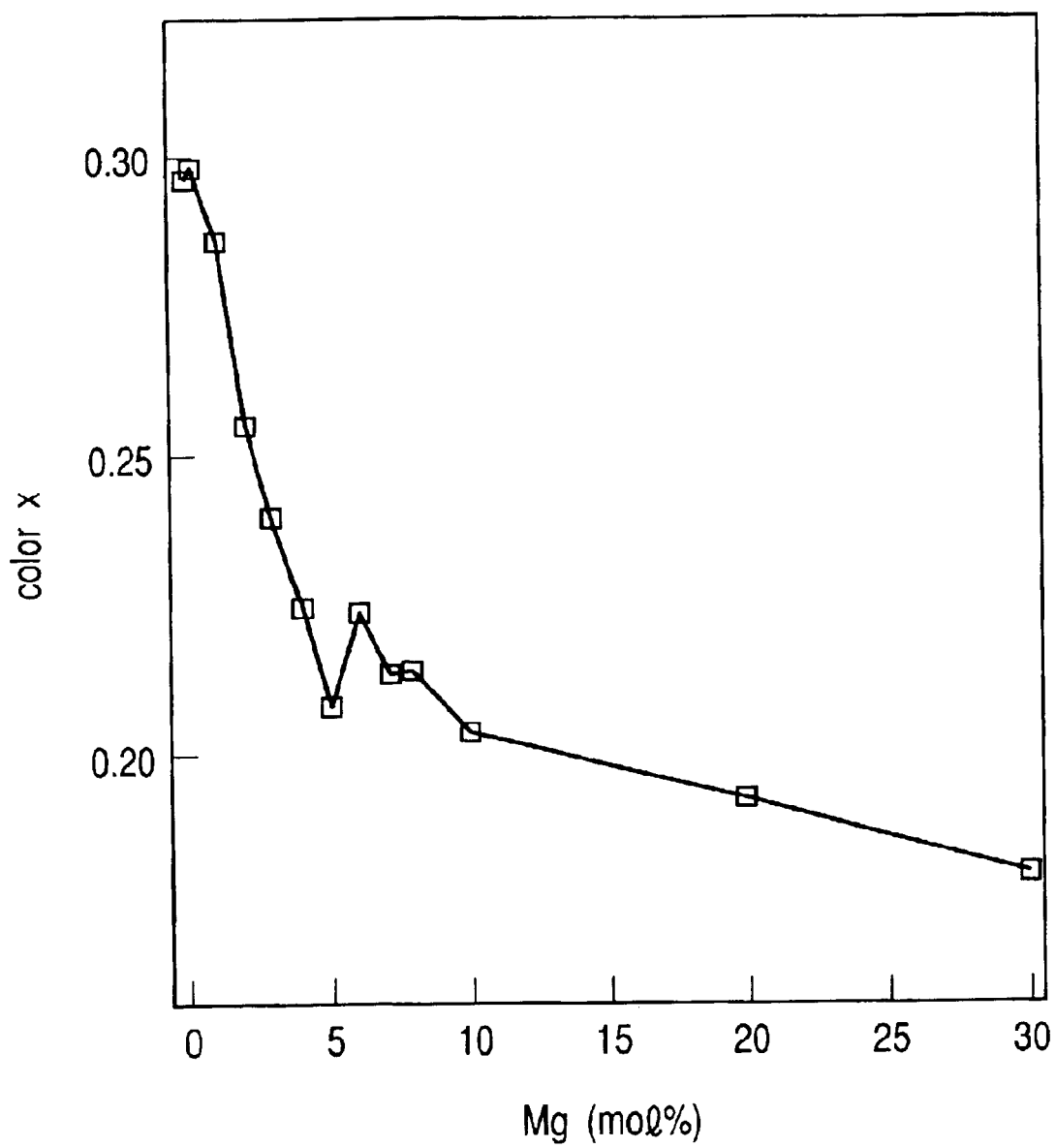
FIG. 3 is a graph showing change in Mg amount to a CIE color coordinate of the phosphor of the present invention.
Figure 4:
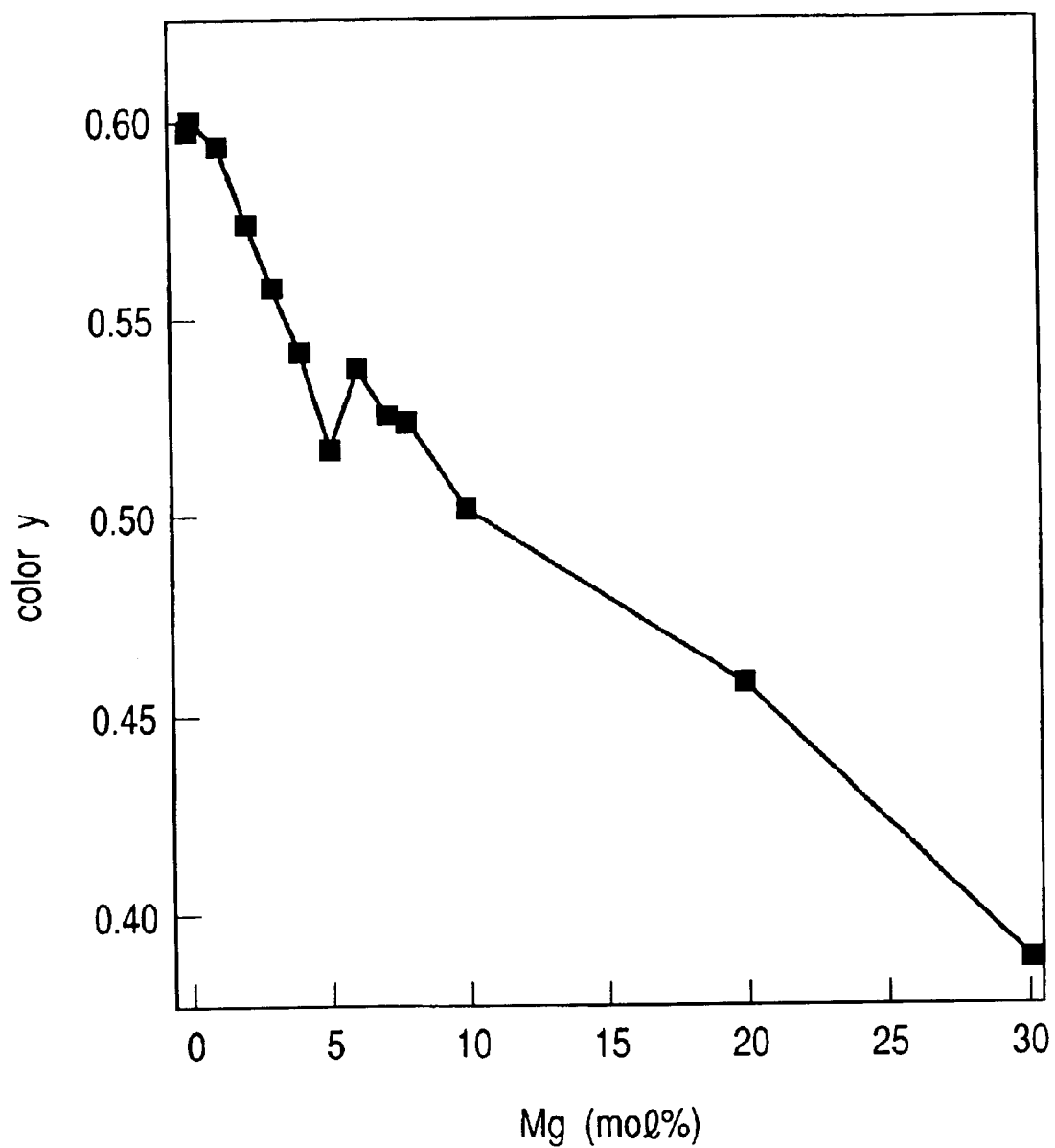
FIG. 4 is a graph showing change in Mg amount to a CIE color coordinate of the phosphor of the present invention.

FIGS. 3 and 4 show CIE color coordinates x and y of the Zn(1−x)MgxS:Cu,Al phosphor. As the Mg solubility is increased, the color coordinates x and y are decreased to be shifted to the blue side. There are two causes as follows. Since the Mg amount is increased, the crystal structure is phase shifted from a cubic form to a hexagonal form so as to increase the bandgap. The bandgap of MgS is 4.8 eV which is larger than 3.7 eV of ZnS and Mg is added to ZnS to make a compound crystal form so that the bandgap is increased in proportion to the Mg amount.

When using the Zn(1−x)MgxS:Cu,Al phosphor as green luminescence in the image-display device, Mg is 0–1 mol % (0<x<0.01) and the CTE color coordinates are y>0.59 and x<0.31. The luminescence is good.

Figure 5:
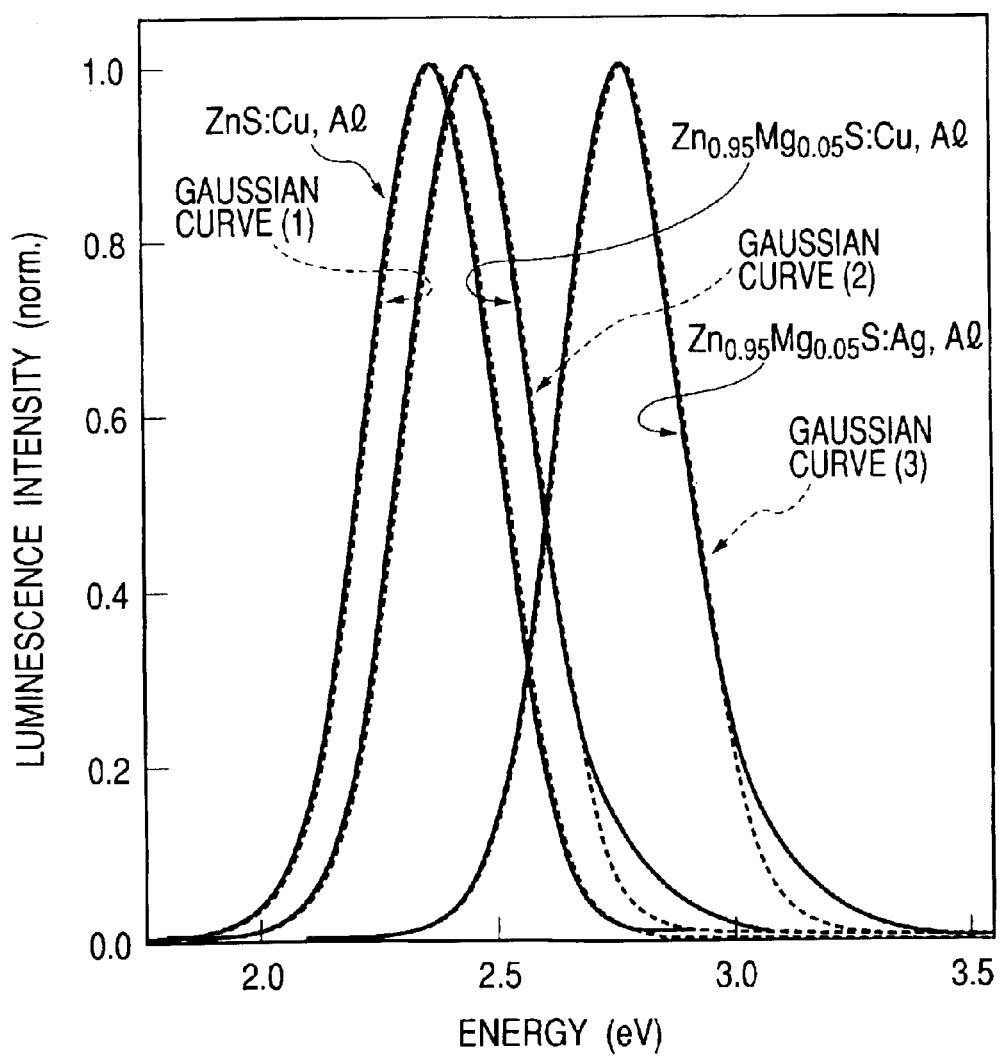
FIG. 5 shows luminescence spectra of the phosphors of the present invention.

FIG. 5 shows the luminescence spectrums of a $Zn_{0.95}Mg_{0.05}S$:Cu,Al phosphor and a ZnS:Cu,Al phosphor as a comparative example. In a phosphor (x=0.05) obtained by adding 5 mol % Mg, a center wave length of luminescence is 507 nm and an energy is 2.45 eV. In a phosphor to which no Mg is added (the comparative example), they are 523 nm and 2.36 eV. The respective luminescence spectrum shapes can be almost approximate by Gauss type curves (1) and (2) (the dotted lines), as shown in FIG. 5.

The Gauss type curve is expressed by $y=\exp(-((x-K1)/K2)^2)$.

The respective constant values are as shown in Table 2.

| Mg solubility x | K1 | K2 |
|---|---|---|
| 0 | 2.36 | 0.188 |
| 0.05 | 2.45 | 0.191 |

K1 indicates the center position of the Gauss type curve. K2 is a constant determining a half value width of the curve. The half value widths of both are almost equal and are similar Gauss type curves.

The crystal structure of ZnS is changed from the cubic form (β) to the hexagonal form (α) at 1020° C. When adding Mg, the crystal structure of the hexagonal form is provided at the calcination temperature below 1020° C.

Figure 6:
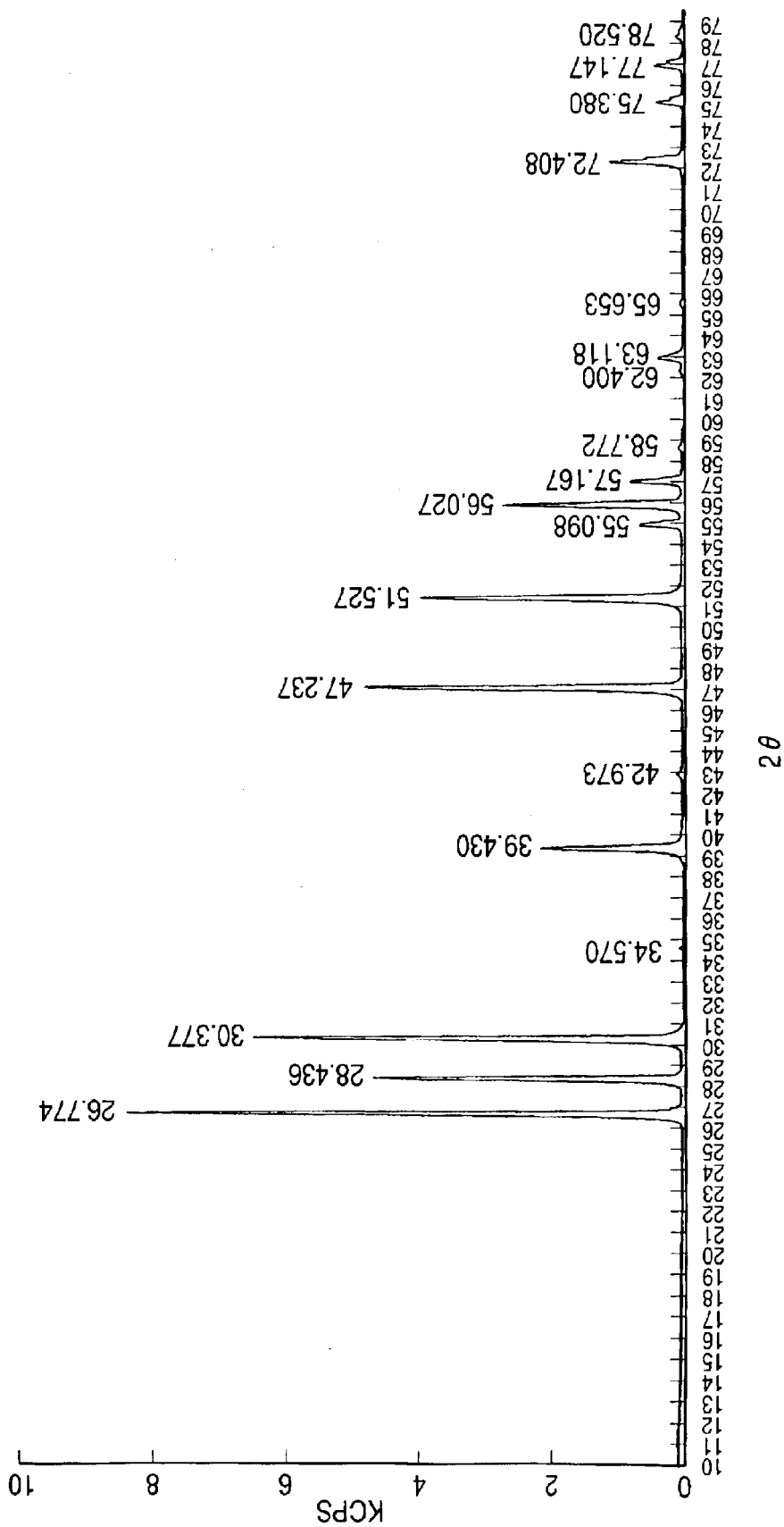
FIG. 6 is an X-ray diffraction diagram of the phosphor of the present invention.
Figure 7:
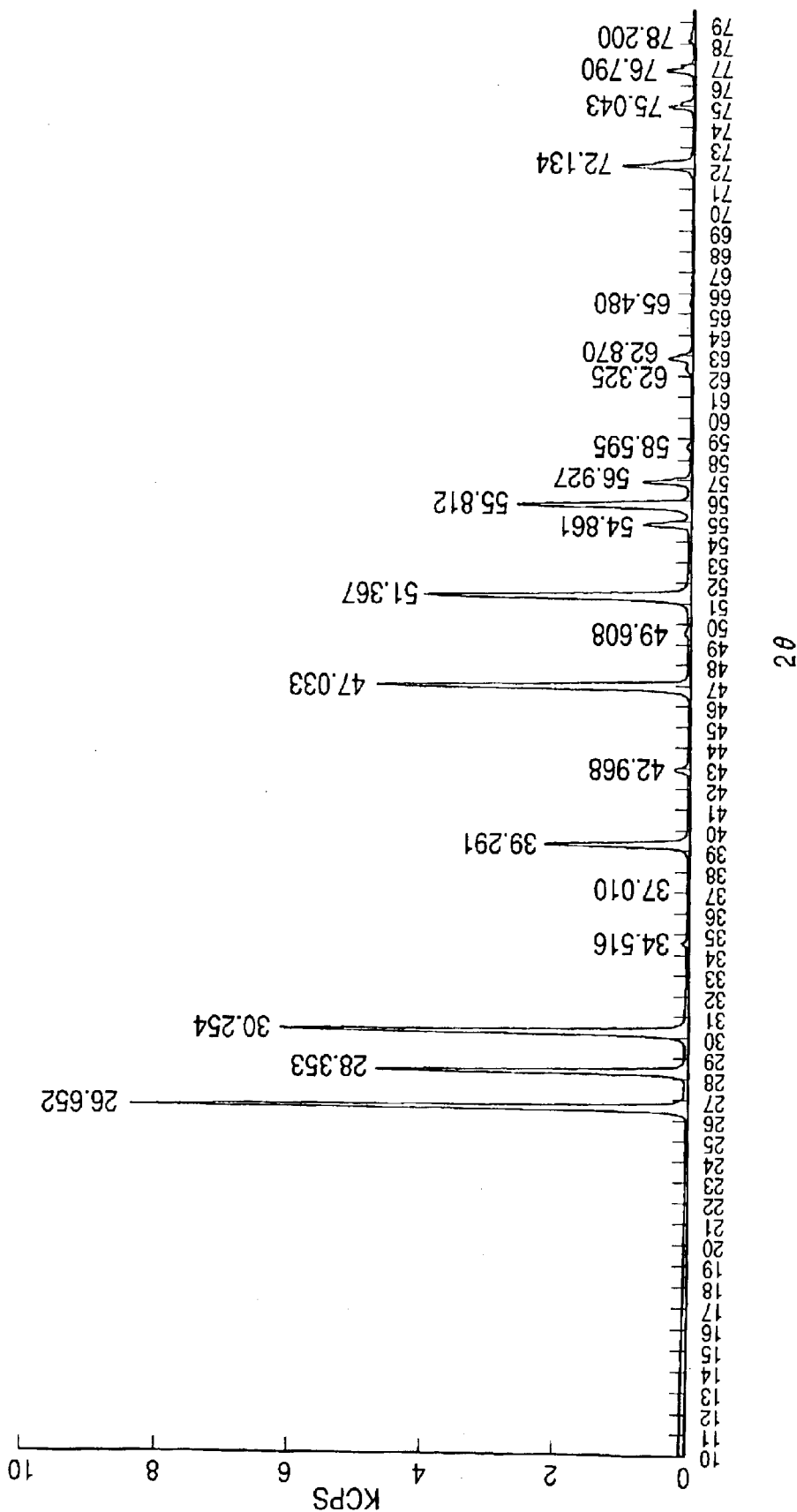
FIG. 7 is an X-ray diffraction diagram of the phosphor of the present invention.
Figure 8:
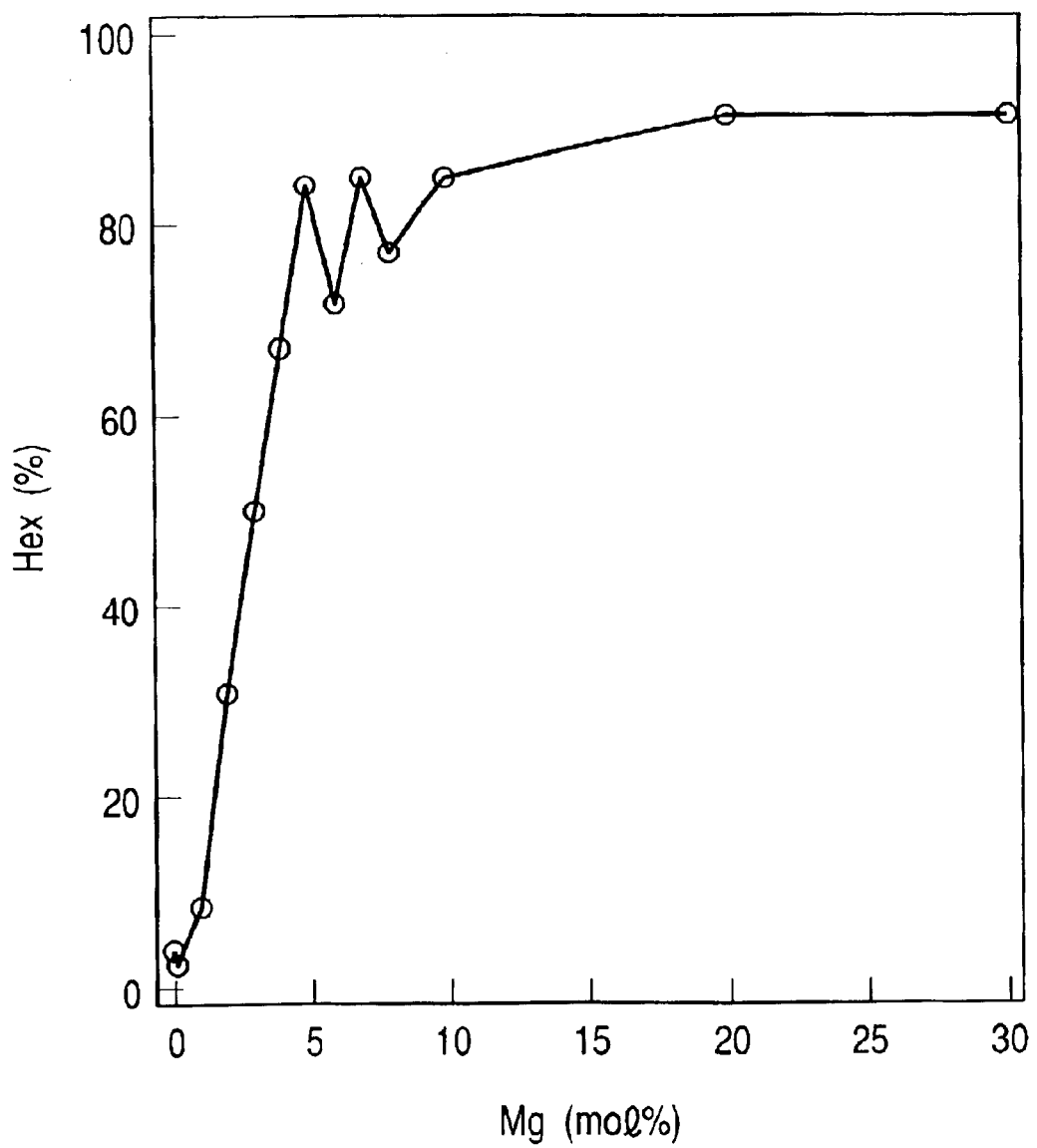
FIG. 8 is a graph showing change in Mg amount to the percentage of a hexagonal form of the phosphor of the present invention.

FIGS. 6 and 7 show X-ray diffraction diagrams when the Mg amounts are 20 mol % (x=0.2) and 30 mol % (x=0.3). As seen in FIG. 6, in the case that the Mg amounts are 20 mol % and 30 mol %, both the hexagonal forms are a main crystal structure. In FIG. 7, the diffraction line of MgS is observed in the position of 2θ=34.5° which hardly appears in FIG. 6. The limit of solid solution of MgS and ZnS is in this. The Zn(1−x)MgxS:Cu,Al phosphor is formed so that the Mg solubility x is 0<x<0.25. The percentage of the hexagonal form can be calculated from the following equation from the X-ray diffraction diagram.

$$Hex (\%)=1.69B/(I1+0.69\times I2)\times 100 \quad (1)$$

where Hex is a content percentage of the hexagonal form (α), I1 is the height of the diffraction line overlapping the hexagonal form (α) and the cubic form (β), and I2 is the height of the diffraction line of the hexagonal form of 2θ=51.7°. FIG. 8 shows change in Mg solubility to the percentage of the hexagonal form content in the total amount. When the Mg amount is increased from 1 mol % to 5 mol %, the percentage of the hexagonal form is increased from 9% to 84%. The bandgap of the hexagonal form is 0.1 eV larger than that of the cubic form. The percentage of the hexagonal form is increased to shift the luminescence to the blue side, as seen in FIG. 3. As green luminescence, it is desirable that the Mg amount be below 3 mol % and the solubility a of the hexagonal form be 0<a <0.40.

The Zn(1−x)MgxS:Cu,Al phosphor is subjected to forceful depreciation for 1800 sec under the conditions of an accelerating voltage of 27.5 kV, an irradiating current density of 100 μA/cm² and a sample temperature of 200° C.

Figure 9:
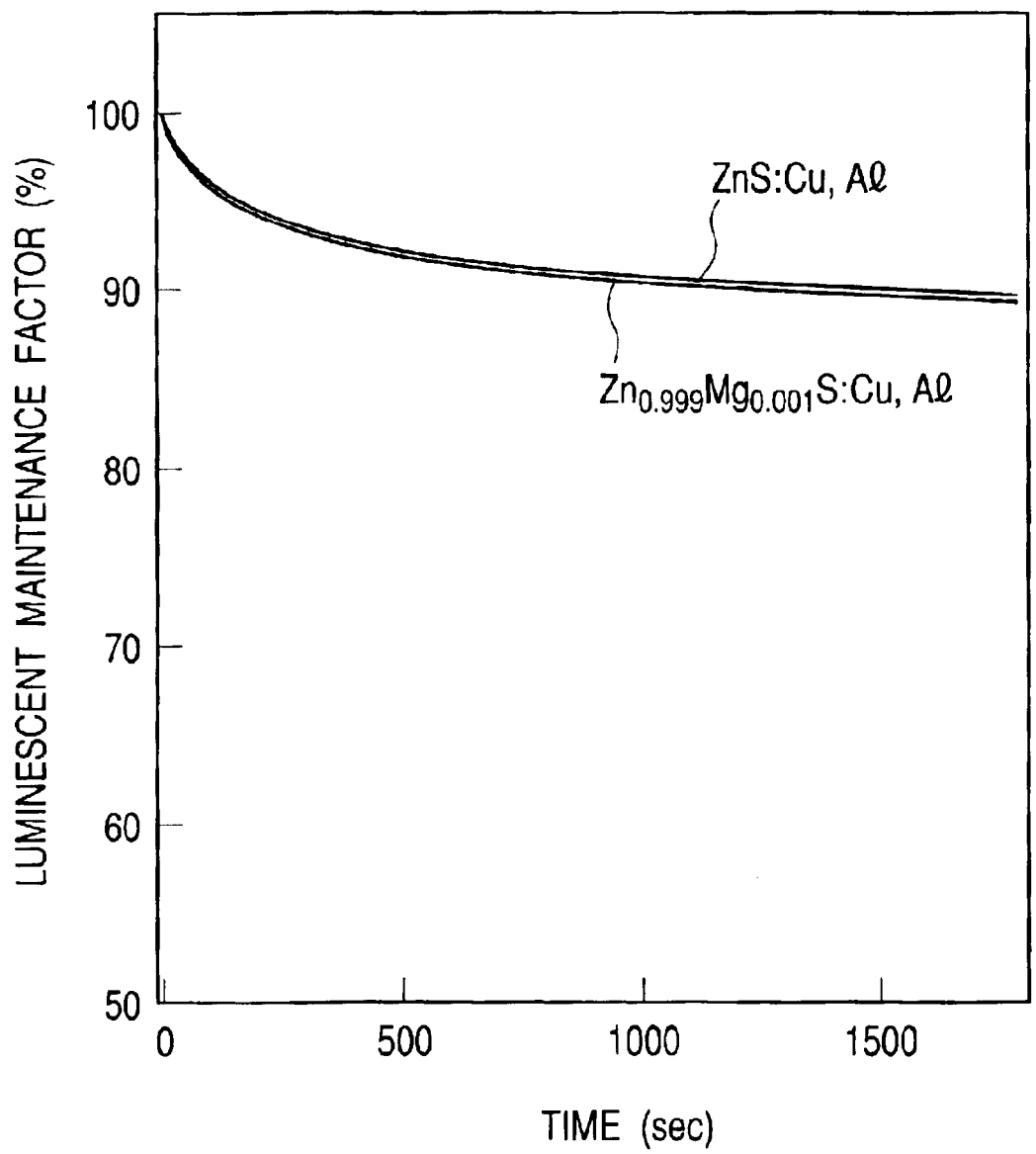
FIG. 9 is a graph showing a luminescent maintenance factor of the phosphor of the present invention.

FIG. 9 shows the measured result of the luminescent maintenance factor of a $Zn_{0.999}Mg_{0.001}S$:Cu,Al phosphor with the result of the ZnS:Cu,Al phosphor as the comparative example. When Mg is 0.1 mol % and Mg is not added, the luminescent maintenance factors are equal. The luminescence maintenance factors after 1800 sec are both 89% when the energy efficiency of initial luminescence is expressed as 100%.

Figure 10:
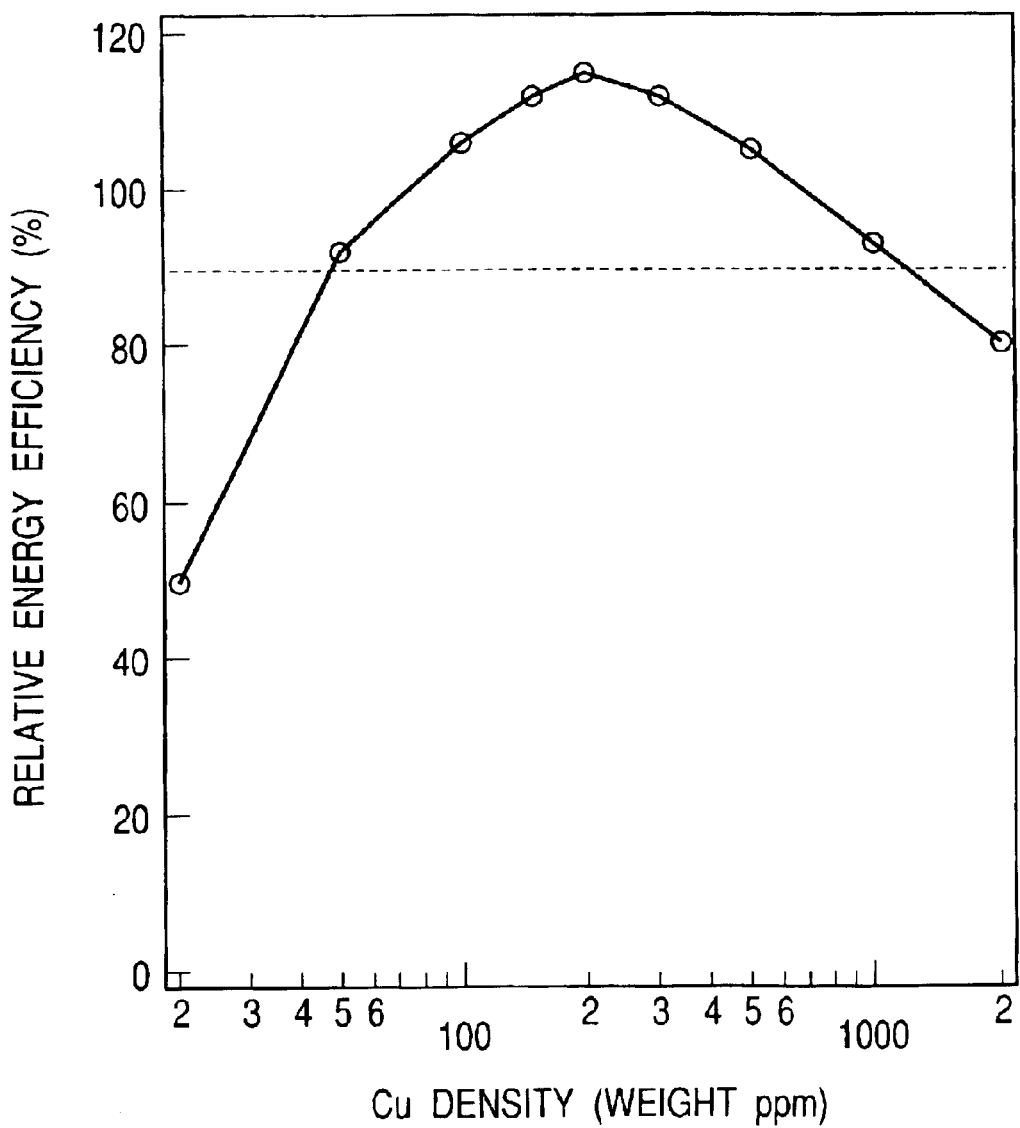
FIG. 10 is a graph showing change in Cu density to a relative energy efficiency of the phosphor of the present invention.

Change in Cu density of the relative energy efficiency of luminescence is studied in the $Zn_{0.999}Mg_{0.001}S$:Cu,Al phosphor. The Cu densities are 20, 50, 100, 150, 200, 300, 500, 1000 and 2000 weight ppm. As seen in FIG. 10, when the Cu density is 200 weight ppm, the relative energy efficiency is highest. When used for green luminescence in the image-display device, it is desirable that the relative energy efficiency to ZnS:Cu,Al have a performance above 90%. In FIG. 10, the adaptable range of the Cu density is 50 weight ppm <[Cu]<1000 weight ppm.

As described above in detail, the $Zn(1-x)Mg_xS:Cu,Al$ phosphor which is made into a compound crystal form by adding Mg to ZnS is manufactured. The $Zn(1-x)Mg_xS:Cu,Al$ phosphor has a relative energy efficiency of luminescence higher than that of the ZnS:Cu,Al phosphor in $0<x<0.07$ (specifically, $x=0.0001-0.06$).

When Mg is increased, the luminescence is shifted to the blue side. The luminescence spectrum hardly has components other than main luminescence and can be approximated by the Gauss type curve.

The Mg amount is selected at the calcination temperature below 1020° C. to provide the hexagonal form ($\alpha$) and the crystal structure can be determined. The luminescent maintenance factor of the phosphor to which Mg is added is almost equal to that to which no Mg is added, which is a good result. The density range of Cu added as the radiative recombination center is 50 weight ppm<[Cu]<1000 weight ppm which is good.

(Embodiment 2)

A $Zn(1-x)Ca_xS:Cu,Al$ phosphor of the present invention can be manufactured by the method described below. CaS (calcium sulfide raw powder) is used as a raw host material. Other raw materials are the same as Embodiment 1. The quantities of the respective raw materials of a $Zn_{0.099}Ca_{0.01}S:Cu,Al$ phosphor (Cu=100 weight ppm and Al=100 weight ppm) having 1 mol % Ca are as follows:

TABLE 2

Constants when luminescence spectrums are approximated by Gauss type curves

| zinc sulfide raw powder | ZnS | 9.649 g |
|---|---|---|
| calcium sulfide raw powder | CaS | 0.072 g |
| copper solution | Cu | 0.153 ml |
| aluminum solution | Al | 0.361 ml |

The above raw materials are used for calcination and post-treatment as in Embodiment 1 to manufacture the $Zn_{0.099}Ca_{0.01}S:Cu,Al$ phosphor. The characteristics such as a luminescence characteristic by electron beam irradiation of the phosphor are good as in Embodiment 1.

(Embodiment 3)

A $Zn(1-x)Sr_xS:Cu,Al$ phosphor of the present invention can be manufactured by the method described below. SrS (strontium sulfide raw powder) is used as a raw host material. Other raw materials are the same as Embodiment 1. The quantities of the respective raw materials of a $Zn_{0.99}Sr_{0.01}S:Cu,Al$ phosphor (Cu=100 weight ppm and Al=100 weight ppm) having 1 mol % Sr are as follows:

| zinc sulfide raw powder | ZnS | 9.649 g |
|---|---|---|
| strontium sulfide raw powder | SrS | 0.120 g |
| copper solution | Cu | 0.153 ml |
| aluminum solution | Al | 0.361 ml |

The above raw materials are used for calcination and post-treatment as in Embodiment 1 to manufacture the $Zn_{0.99}Sr_{0.01}S:Cu,Al$ phosphor. The characteristics such as a luminescence characteristic by electron beam irradiation of the phosphor are good as in Embodiment 1.

A $Zn(1-x-y)Mg_xCa_y:Cu,Al$ phosphor of the present invention can be manufactured by the method described below. Raw materials are the same as the above embodiment. The quantities of the respective raw materials of a $Zn_{0.98}Mg_{0.01}Ca_{0.01}:Cu,Al$ phosphor (Cu=100 weight ppm and Al=100 weight ppm) having 1 mol % Mg and Ca are as follows:

| zinc sulfide raw powder | ZnS | 9.551 g |
|---|---|---|
| magnesium sulfide raw powder | MgS | 0.056 g |
| calcium sulfide raw powder | CaS | 0.072 g |
| copper solution | Cu | 0.153 ml |
| aluminum solution | Al | 0.361 ml |

The above raw materials are used for calcination and post-treatment as in Embodiment 1 to manufacture the $Zn_{0.98}Mg_{0.01}Ca_{0.01}:Cu,Al$ phosphor. The characteristics such as a luminescence characteristic by electron beam irradiation of the phosphor are good as in Embodiment 1.

(Embodiment 5)

A $Zn(1-x-y-z)Mg_xCa_ySr_z:Cu,Al$ phosphor of the present invention can be manufactured by the method described below. Raw materials are the same as the above embodiment. The quantities of the respective raw materials of a $Zn_{0.97}Mg_{0.01}Ca_{0.01}Sr_{0.01}:Cu,Al$ phosphor (Cu=100 weight ppm and Al=100 weight ppm) having 1 mol % Mg, Ca and Sr are as follows:

| zinc sulfide raw powder | ZnS | 9.454 g |
|---|---|---|
| magnesium sulfide raw powder | MgS | 0.056 g |
| calcium sulfide raw powder | CaS | 0.072 g |
| strontium sulfide raw powder | SrS | 0.120 g |
| copper solution | Cu | 0.153 ml |
| aluminum solution | Al | 0.361 ml |

The above raw materials are used for calcination and post-treatment as in Embodiment 1 to manufacture the $Zn_{0.97}Mg_{0.01}Ca_{0.01}Sr_{0.01}:Cu,Al$ phosphor. The characteristics such as a luminescence characteristic by electron beam irradiation of the phosphor are good as in Embodiment 1.

(Embodiment 6)

A $Zn(1-x)Mg_xS:Ag,Al$ phosphor of the present invention can be manufactured by the method described below. As Ag used as an activator, $AgNO_3$ is dissolved into pure water to prepare a $10^{-4}$ mol/ml solution, which is then added in a predetermined amount. Other raw materials are the same as Embodiment 1. The quantities of the respective raw materials of a $Zn_{0.99}Mg_{0.01}S:Ag,Al$ phosphor (Ag=500 weight ppm and Al=200 weight ppm) having 1 mol % Mg are as follows:

| zinc sulfide raw powder | ZnS | 9.649 g |
|---|---|---|
| magnesium sulfide raw powder | MgS | 0.056 g |
| silver solution | Ag | 0.451 ml |
| aluminum solution | Al | 0.722 ml |

The above raw materials are used for calcination and post-treatment as in Embodiment 1 to manufacture the $Zn_{0.99}Mg_{0.01}S:Ag,Al$ phosphor.

The $Zn(1-x)Mg_xS:Ag,Al$ phosphor has a relative energy efficiency of luminescence higher than that of the ZnS:Ag,Al phosphor in the range that the Mg solubility x is $0<x<0.20$ (specifically, $x=0.0001-0.20$).

As seen in FIG. 5, the luminescence spectrum has no components other than main luminescence and can be approximated by the Gauss type curve. The density range of Ag added as the radiative recombination center is 50 weight ppm<[Cu]<2000 weight ppm which is good. As described above, the characteristics such as a luminescence characteristic by electron beam irradiation of the $Zn(1-x)Mg_xS:Ag,Al$ phosphor are good as in Embodiment 1.

(Embodiment 7)

A Zn(1-x)MgxS:Ag,Cu,Al phosphor of the present invention can be manufactured by the method described below. Raw materials are the same as the above embodiment. The quantities of the respective raw materials of a $Zn_{0.99}Mg_{0.01}S:Ag,Cu,Al$ phosphor (Ag=500 weight ppm, Cu=20 weight ppm and Al=200 weight ppm) having 1 mol % Mg are as follows:

| zinc sulfide raw powder | ZnS | 9.649 g |
|---|---|---|
| magnesium sulfide raw powder | MgS | 0.056 g |
| silver solution | Ag | 0.451 ml |
| copper solution | Cu | 0.031 ml |
| aluminum solution | Al | 0.722 ml |

The above raw materials are used for calcination and post-treatment as in Embodiment 1 to manufacture the $Zn_{0.99}Mg_{0.01}S:Ag,Cu,Al$ phosphor. The characteristics such as a luminescence characteristic by electron beam irradiation of the phosphor are good as in Embodiment 1.

(Embodiment 8)

A Zn(1-x)MgxS:Cu,Ga phosphor of the present invention can be manufactured by the method described below. As Ga used as a co-activator, $Ga_2(SO_4)_3$ is dissolved into pure water to prepare a $10^{-5}$ mol/ml solution, which is then added in a predetermined amount. Other raw materials are the same as Embodiment 1. The quantities of the respective raw materials of a $Zn_{0.99}Mg_{0.01}S:Cu,Ga$ phosphor (Cu=100 weight ppm and Ga=165 weight ppm) are as follows:

| zinc sulfide raw powder | ZnS | 9.649 g |
|---|---|---|
| magnesium sulfide raw powder | MgS | 0.056 g |
| copper solution | Cu | 0.153 ml |
| gallium solution | Ga | 2.301 ml |

The above raw materials are used for calcination and post-treatment as in Embodiment 1 to manufacture the $Zn_{0.99}Mg_{0.01}S:Cu,Ga$ phosphor. The color coordinate characteristic by electron beam irradiation of the phosphor is good as in Embodiment 1.

(Embodiment 9)

A Zn(1-x)MgxS:Cu,Al,Ga phosphor of the present invention can be manufactured by the method described below. Raw materials are the same as the above embodiment. The quantities of the respective raw materials of a $Zn_{0.99}Mg_{0.01}S:Cu,Al,Ga$ phosphor (Cu=100 weight ppm, Al=100 weight ppm and Ga=17 weight ppm) are as follows:

| zinc sulfide raw powder | ZnS | 9.649 g |
|---|---|---|
| magnesium sulfide raw powder | MgS | 0.056 g |
| copper solution | Cu | 0.153 ml |
| aluminum solution | Al | 0.361 ml |
| gallium solution | Ga | 0.230 ml |

The above raw materials are used for calcination and post-treatment as in Embodiment 1 to manufacture the $Zn_{0.99}Mg_{0.01}S:Cu,Al,Ga$ phosphor. The color coordinate characteristic by electron beam irradiation of the phosphor is good as in Embodiment 1.

(Embodiment 10)

A Zn(1-x)MgxS:Cu,Al phosphor of the present invention can also be manufactured by a method using a flux. The quantities of the respective raw materials of a $Zn_{0.99}Mg_{0.01}S:Cu,Al$ phosphor (Cu=100 weight ppm and Al=100 weight ppm) having 1 mol % Mg are as follows by adding $BaBr_2$ as an example of the flux to the raw materials of Embodiment 1:

| zinc sulfide raw powder | ZnS | 9.649 g |
|---|---|---|
| magnesium sulfide raw powder | MgS | 0.056 g |
| copper solution | Cu | 0.153 ml |
| aluminum solution | Al | 0.361 ml |
| barium bromide | $BaBr_2$ | 0.297 g |
| sulfur | S | 0.5 g |

As an atmosphere adjustor, a sulfur powder is added. The above raw materials are well mixed and dried. The obtained phosphor raw material mixture is filled into an alumina crucible to be set into a muffle furnace for calcination. The calcination temperature is 950° C. and the calcination time is 2 hours. The calcined product is sufficiently washed by water and dried for sieving, thereby obtaining the phosphor used in the present invention. The characteristics such as a luminescence characteristic by electron beam irradiation of the phosphor are good as in Embodiment 1.

(Embodiment 11)

A Zn(1-x)MgxS: Au, Al phosphor of the present invention can be manufactured by the method described below. As Au used as an activator, a solution dissolved by aqua regia is diluted by pure water to prepare a $10^{-4}$ mol/ml solution, which is then added in a predetermined amount. Other raw materials are the same as Embodiment 1. The quantities of the respective raw materials of a $Zn_{0.75}Mg_{0.25}S:Au,Al$ phosphor (Au=1,000 weight ppm and Al=205 weight ppm) having 25 mol % Mg are as follows:

| zinc sulfide raw powder | ZnS | 7.310 g |
|---|---|---|
| magnesium sulfide raw powder | MgS | 1.410 g |
| gold solution | Au | 0.495 ml |
| aluminum solution | Al | 0.7420 ml |

The above raw materials are used for calcination and post-treatment as in Embodiment 1 to manufacture the $Zn_{0.75}Mg_{0.25}S:Au,Al$ phosphor. The characteristics such as a luminescence characteristic by electron beam irradiation of the phosphor are good as the green luminescence phosphor.

(Embodiment 12)

A Zn(1-x-y-z)MgxBeyBazS:Cu,Al phosphor of the present invention can be manufactured by the method described below. $BeCO_3$ (beryllium carbonate raw powder) and BaS (barium sulfide raw powder) are used as a raw host material. Other raw materials are the same as Embodiment 1. The quantities of the respective raw materials of a $Zn_{0.96}Mg_{0.03}Be_{0.005}Ba_{0.005}S:Cu,Al$ phosphor (Cu=100 weight ppm and Al=100 weight ppm) having 0.5 mol % Be and Ba are as follows:

| zinc sulfide raw powder | ZnS | 9.356 g |
|---|---|---|
| magnesium sulfide raw powder | MgS | 0.169 g |
| beryllium carbonate raw powder | $BeCO_3$ | 0.035 g |
| barium sulfide raw powder | BaS | 0.085 g |
| copper solution | Cu | 0.153 ml |
| aluminum solution | Al | 0.361 ml |

The above raw materials are used for calcination and post-treatment as in Embodiment 1 to manufacture the $Zn_{0.96}Mg_{0.03}Be_{0.005}Ba_{0.005}S:Cu,Al$ phosphor. The characteristics such as a luminescence characteristic by electron beam irradiation of the phosphor are good as in Embodiment 1.

(Embodiment 13)

A Zn(1−x)MgxS:Cu, In phosphor of the present invention can be manufactured by the method described below. As In used as a co-activator, $In_2(SO_4)_3$ is dissolved into pure water to prepare a $10^{-5}$ mol/ml solution, which is then added in a predetermined amount. Other raw materials are the same as Embodiment 1. The quantities of the respective raw materials of a $Zn_{0.99}Mg_{0.01}S$:Cu, In phosphor (Cu=100 weight ppm and In=271 weight ppm) are as follows:

| zinc sulfide raw powder | ZnS | 9.649 g |
|---|---|---|
| magnesium sulfide raw powder | MgS | 0.056 g |
| copper solution | Cu | 0.153 ml |
| indium solution | In | 2.301 ml |

The raw above materials are used for calcination and post-treatment as in Embodiment 1 to manufacture the $Zn_{0.99}Mg_{0.01}S$:Cu, In phosphor. The color coordinate characteristic by electron beam irradiation of the phosphor is good as in Embodiment 1.

(Embodiment 14)

A Zn(1−x)MgxS:Cu, Sc phosphor of the present invention can be manufactured by the method described below. As Sc used as a co-activator, $Sc(NO_3)_3$ is dissolved into pure water to prepare a $10^{-5}$ mol/ml solution, which is then added in a predetermined amount. Other raw materials are the same as Embodiment 1. The quantities of the respective raw materials of a $Zn_{0.99}Mg_{0.01}S$:Cu, Sc phosphor (Cu=100 weight ppm and Sc 106 weight ppm) are as follows:

| zinc sulfide raw powder | ZnS | 9.649 g |
|---|---|---|
| magnesium sulfide raw powder | MgS | 0.056 g |
| copper solution | Cu | 0.153 ml |
| scandium solution | Sc | 2.301 ml |

The above raw materials are used for calcination and post-treatment as in Embodiment 1 to manufacture the $Zn_{0.99}Mg_{0.01}S$:Cu, Sc phosphor. The color coordinate characteristic by electron beam irradiation of the phosphor is good as in Embodiment 1.

Embodiments 1–14 list the methods for manufacturing a phosphor having a main combination of the present invention which are expressed by a general formula Zn (1−x) MIIAxS: MIB, MIII where MIIA is one or more MIIIA elements (Sc, Y) and IIA elements (Be, Mg, Ca, Sr, Ba) in an element periodic table; MIB is one or more IB elements (Cu, Ag, Au) therein; and MIII is one or more MIIIB elements (Al, Ga, In) therein.

Other phosphors of the present invention can be obtained by combining a IIA element for use in a host crystal, a IB element and MIIIA, B elements added as the radiative recombination center. The phosphors manufactured as described above are used to form a phosphor layer on various faceplates. It is possible to manufacture an excellent image-display device for use in a Braun tube such as a color display tube (CDT), a projection tube (PRT) or a display with metal-insulator-metal (MIM) type electron source and a display with field emission display (FED) type electron source using an electron emission device. Specific examples of the image-display devices will be described in the embodiments below in detail.

The present invention will be described below by taking specific examples. Needless to say, the present invention is not limited to the examples and includes substitution of elements and design modification in the range achieving an object of the present invention.

EXAMPLE 1

Figure 11:
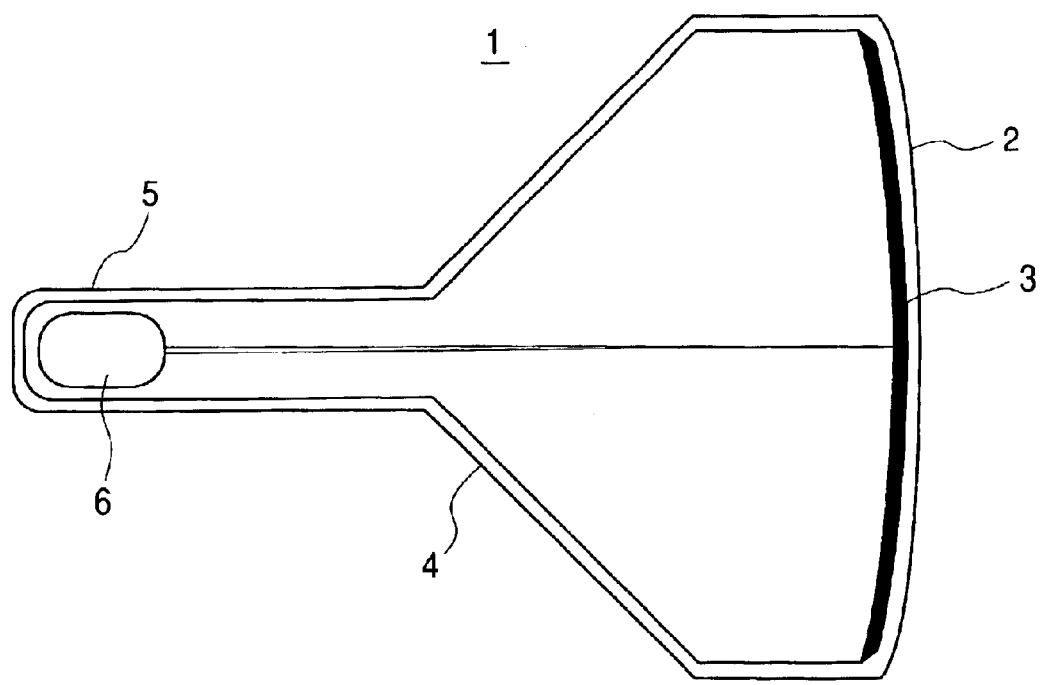
FIG. 11 is a schematic diagram showing the entire construction of a Braun tube of the present invention.

Color Display Tube (CDT) 1:

FIG. 11 shows a color display tube of the present invention. The color display tube has a faceplate 2, a funnel 4 and a neck 5. The neck 5 has, in its inside, an electron gun 6 generating an electron beam.

The faceplate 2 has, in its inside, a phosphor layer 3 onto which a Zn(1−x)MgxS:Cu,Al phosphor of x=0.01 is coated as a green luminescence phosphor. The phosphor used is a particle of 5–8 $\mu$m and the phosphor layer has a largest layer thickness of about 15 $\mu$m.

To increase the resolution, a black conductive material is provided at one-dot interval. To manufacture the black conductive material, a photo-resist layer is coated onto the entire surface to be exposed and developed via a mask and the photo-resist layer is left partially. A graphite layer is formed on the entire surface, on which hydrogen peroxide acts. The photo-resist layer and the graphite thereon are removed to form the black conductive material.

A metal back is manufactured by subjecting the inner surface of the phosphor layer 3 to a filming process to vacuum deposit Al. It is heat treated to splash a filming agent. The phosphor layer 3 is thus completed.

When the irradiating current density is 0.25 $\mu$A/cm$^2$, the energy efficiency of luminescence is increased by 2%. In the CIE color coordinates, the y value is 0.59 and the x value is 0.29.

EXAMPLE 2

Color Display Tube (CDT) 2:

A color display tube of the present invention has the same parts as Example 1. A faceplate 2 has, in its inside, a phosphor layer 3 onto which a Zn(1−x)MgxS:Cu,Al phosphor of x=0.001 is coated as a green luminescence phosphor. The phosphor used is a particle of 5–8 $\mu$m and the phosphor layer has a largest layer thickness of about 15 $\mu$m. The methods for forming the black conductive material and the metal back are the same as Example 1.

When the irradiating current density is 0.25 $\mu$A/cm$^2$, the energy efficiency of luminescence is increased by 6%. In the CIE color coordinates, the y value is 0.60 and the x value is 0.30.

EXAMPLE 3

Color Display Tube (CDT) 3:

A color display tube of the present invention has the same parts as Example 1. A faceplate 2 has, in its inside, a phosphor layer 3 onto which a Zn(1−x−y)MgxCay:Cu,Al phosphor of x=0.01 and y=0.01 is coated as a green luminescence phosphor.

The phosphor used is a particle of 5–8 $\mu$m and the phosphor layer has a largest layer thickness of about 15 $\mu$m. The methods for forming the black conductive material and the metal back are the same as Example 1.

When the irradiating current density is 0.25 $\mu$A/cm$^2$, the energy efficiency of luminescence is good. The green luminescence is good.

EXAMPLE 4

Projection Tube (PRT) 1:

A projection tube of the present invention has the same parts as Example 1. A faceplate 2 has, in its inside, a phosphor layer 3 onto which a Zn(1−x)MgxS:Ag,Al phosphor of x=0.001 is coated as a blue luminescence phosphor.

To manufacture the phosphor layer 3, an electrolytic water solution such as barium acetate is supplied into a Braun tube to inject a phosphor suspension obtained by mixing the Zn(1−x)MgxS:Ag,Al phosphor and water glass. After still standing, the liquid is discharged for drying to form the phosphor layer 3.

The Zn(1−x)MgXS:Ag,Al phosphor is a particle of 10–13 μm and has a layer thickness of about 30 μm. A metal back is manufactured by subjecting the phosphor layer 3 to a filming process to vacuum deposit Al. It is heat treated to splash a filming agent. The phosphor layer 3 is thus completed.

When the irradiating current density is 30 μA/cm², the energy efficiency of luminescence is increased by 5%. In the CIE color coordinates, the y value is 0.06 and the x value is 0.14.

EXAMPLE 5

Projection Tube (PRT) 2:

A projection tube of the present invention has the same parts as Example 1. A faceplate 2 has, in its inside, a phosphor layer 3 onto which a Zn(1−x)MgxS:Ag,Al phosphor of x=0.004 is coated as a blue luminescence phosphor. The phosphor layer 3 is manufactured as in Example 3.

When the irradiating current density is 30 μA/cm², the energy efficiency of luminescence is increased by 5%. In the CIE color coordinates, the y value is 0.04 and the x value is 0.14.

EXAMPLE 6

Projection Tube (PRT) 3:

A projection tube of the present invention has the same parts as Example 1. A faceplate 2 has, in its inside, a phosphor layer 3 onto which a Zn(1−x)Mgx:Ag,Cu,Al phosphor of x=0.01 is coated as a blue luminescence phosphor. The phosphor layer 3 is manufactured as in Example 3.

When the irradiating current density is 30 μA/cm², the energy efficiency of luminescence is good. The blue luminescence is good.

EXAMPLE 7

Figure 12:
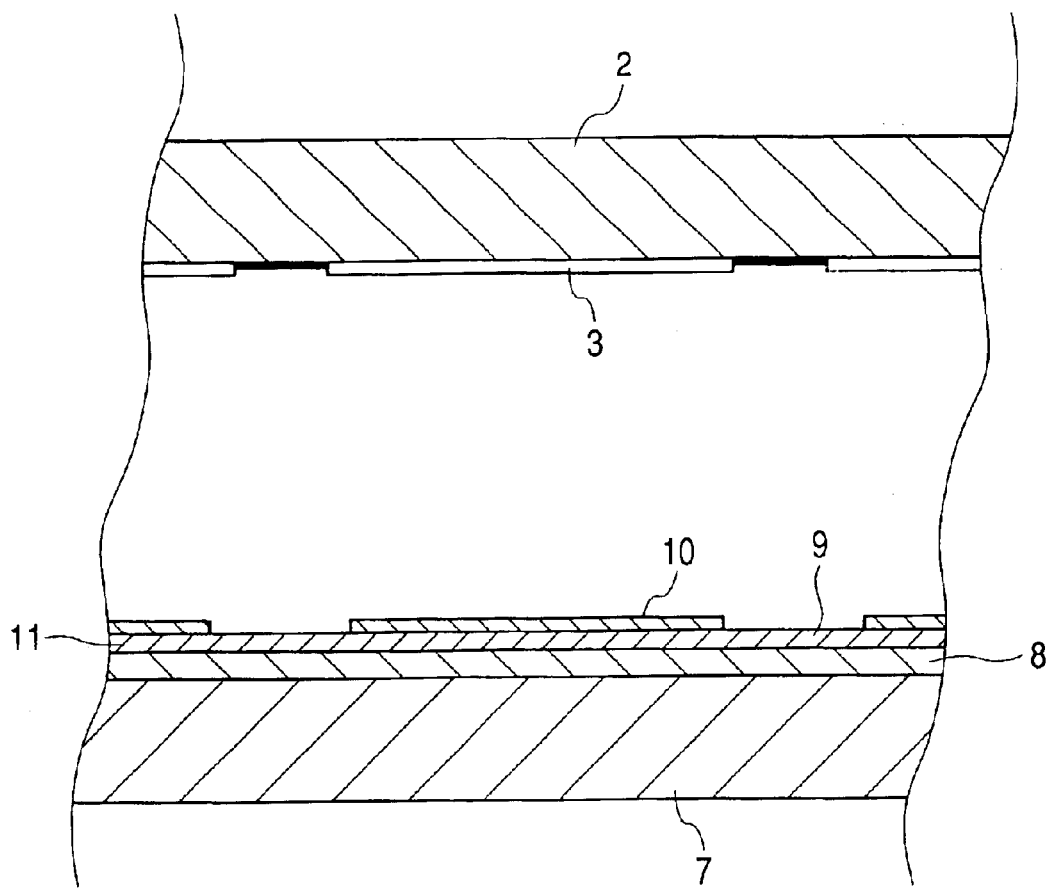
FIG. 12 is a schematic diagram showing the entire construction of a display with MIM type electron source.

Display with MIM Type Electron Source:

FIG. 12 shows a display with MIM type electron source of the present invention. A display 12 with MIM type electron source has a faceplate 2, an MIM electron sourcell, and a rear plate 7. The MIM type electron source 11 is formed by a lower part electrode (Al) 8, an insulator layer ($Al_2O_3$) 9, and an upper part electrode (Ir—Pt—Au) 10.

The faceplate 2 has, in its inside, a phosphor layer 3 onto which a Zn(1−x)MgxS:Cu,Al phosphor of x=0.01 is coated as a green luminescence phosphor. The phosphor used is a particle of 5–8 μm and the phosphor layer has a largest layer thickness of about 15 μm. The methods for forming the black conductive material and the metal back are the same as Example 1.

When the irradiating current density is 10 μA/cm², the energy efficiency of luminescence is increased by 5%. In the CIE color coordinates, the y value is 0.59 and the x value is 0.29.

EXAMPLE 8

Figure 13:
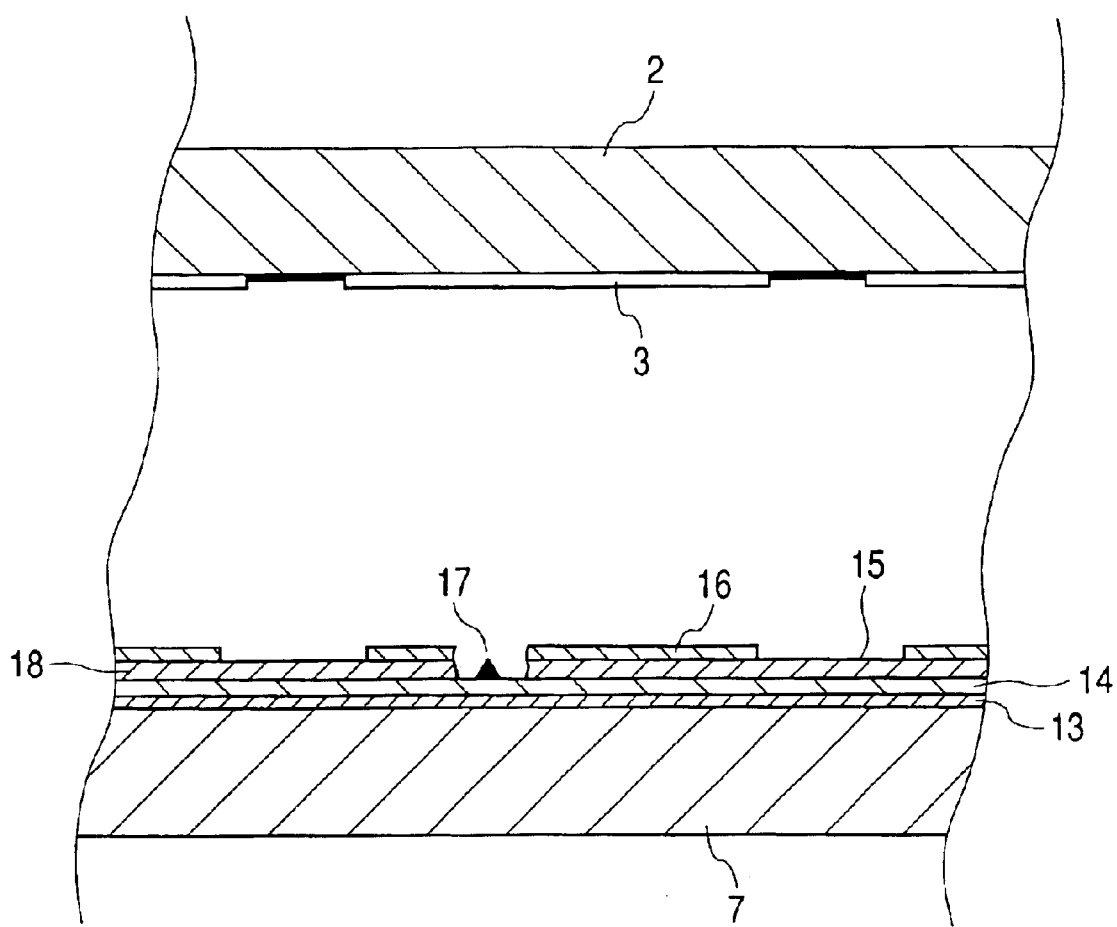
FIG. 13 is a schematic diagram showing the entire construction of a display with FED type electron source.

Display with FED Type Electron Source:

FIG. 13 shows a display with FED type electron source of the present invention. A display 19 with FED type electron source has a faceplate 2, an FED electron source 18, and a rear plate 7. The FED type electron source 18 is formed by a cathode 13, a resistance layer 14, an insulator layer 15, a gate 16, and a spindle type electron emitter (such as Mo) 17.

The faceplate 2 has, in its inside, a phosphor layer 3 onto which a Zn(1−x)MgxS:Cu,Al phosphor of x=0.01 is coated as a green luminescence phosphor. The phosphor used is a particle of 5–8 μm and the phosphor layer has a largest layer thickness of about 15 μm. The methods for forming the black conductive material and the metal back are the same as Example 1.

When the irradiating current density is 10 μA/cm², the energy efficiency of luminescence is increased by 5%. In the CIE color coordinates, the y value is 0.59 and the x value is 0.29.

INDUSTRIAL APPLICABILITY

In the image-display device of the present invention, the IIA element in an element periodic table is added to the ZnS phosphor to make Zn(1−x)MIIAxS:MIB,MIII so that Zn site substitution of the IB element as the radiative recombination center is easy to improve the luminescence efficiency. The crystal structure and the bandgap are changed to vary the luminescence color.

What is claimed is:

1. An image-display device comprising
   a faceplate formed with a phosphor layer, and
   a device adapted to apply an electron beam to said phosphor layer, wherein said phosphor layer consists of a ZnS phosphor which is expressed by a general formula:

$$Zn_{(1-x)}MIIAxS:MIB,MIII$$

where
   MIIA is at least one IIA element selected from the group of Be, Mg, Ca, Sr and Ba;
   MIIB is at least one IB element selected from the group of Cu, Ag and Au;
   MIII is a III element including at least one of Al and Ga; and
   a solubility x is 0<x<0.25.
   wherein a crystal structure of said ZnS phosphor is a compound crystal form comprising a hexagonal form (α) and a cubic form (β), wherein a composition formula for said crystal structure is a formula $α_aβ_{(1-a)}$, a solubility α is 0<a<0.40.

2. The image-display device according to claim 1, wherein said solubility x is 0.0001<x<0.25.

3. An image-display device according to claim 1, the image-display is a cathode-ray tube selected from the group consisting of color display tube and projection tube.

4. An image-display device according to claim 1, the device which is adapted to apply an electron beam to said phosphor layer, is an electron source selected from the group consisting of MIM type electron source and FED type electron source.

5. The image-display device according to claim 1, wherein said crystal structure of ZnS phosphor is formed in a calcination process that occurs at a temperature within 950° C. and 1000° C.

6. An image-display device comprising
   a faceplate formed with a phosphor layer, and
   a device adapted to apply an electron beam to said phosphor layer, wherein said phosphor layer consists of a ZnS phosphor which is expressed by a general formula:

$$Zn(1-x)MxS:Cu,Al$$

where

M is a least one element selected from the group of Mg, Ca and Sr; and a solubility x is $0<x<x<0.07$, wherein a crystal structure of said ZnS phosphor is a compound crystal form comprising a hexagonal form ($\alpha$) and a cubic form ($\beta$), wherein a composition formula for said crystal structure formula $\alpha_a\beta_{(1-a)}$, a solubility $\alpha$ is $0<a<0.40$.

7. An image-display device according to claim 6, the image-display is a cathode-ray tube selected from the group consisting of color display tube and projection tube.

8. An image-display device according to claim 6, the device which is adapted to apply an electron beam to said phosphor layer, is an electron source selected from the group consisting of MIM type electron source and FED type electron source.

9. The image-display device according to claim 6, wherein said crystal structure of ZnS phosphor is formed in a calcination process that occurs at a temperature within 950° C. and 1000° C.

10. An image-display device comprising a faceplate formed with a phosphor layer, and a device adapted to apply an electron beam to said phosphor layer, wherein said phosphor layer consisting consists of a ZnS phosphor which is expressed by a general formula:

$$Zn(1-x)MxS:Cu,Al$$

where

M is a least one element selected from the group of Mg, Ca and Sr, and a solubility x has a good linearity $\gamma$ is $0<x<0.07$, wherein a crystal structure of said ZnS phosphor is a compound crystal form comprising a hexagonal form ($\alpha$) and a cubic form ($\beta$), wherein a composition formula for said crystal structure formula $\alpha_a\beta_{(1-a)}$, a solubility $\alpha$ is $0<a<0.40$.

11. The image-display device according to claim 10, wherein said solubility x is $0.0001<x<0.07$.

12. The image-display device according to claim 11, wherein in said phosphor in which the general formula is expressed by Zn(1-x) MxS: Cu, Al, a Cu density is in the range of 50 weight ppm<Cu<1000 weight ppm.

13. The image-display device according to claim 10, wherein in said phosphor in which the general formula is expressed by Zn(1-x) MxS: Cu, Al, a Cu density is in the range of 50 weight ppm<Cu<1000 weight ppm.

14. An image-display device according to claim 10, the image-display is a cathode-ray tube selected from the group consisting of color display tube and projection tube.

15. An image-display device according to claim 10, the device which is adapted to apply an electron beam to said phosphor layer, is an electron source selected from the group consisting of MIM type electron source and FED type electron source.

16. The image-display device according to claim 10, wherein said crystal structure of ZnS phosphor is formed in a calcination process that occurs at a temperature within 950° C. and 1000° C.

17. An image-display device comprising a faceplate formed with a phosphor layer, and a device adapted to apply an electron beam to said phosphor layer, wherein said phosphor layer consists of a ZnS phosphor which is expressed by a general formula:

$$Zn(1-x)MxS:Cu,Al$$

where

M is a least one element selected from the group of Mg, Ca and Sr; and a solubility x is $0<x<0.20$, wherein a crystal structure of said ZnS phosphor is a compound crystal form comprising a hexagonal form ($\alpha$) and a cubic form ($\beta$) wherein a composition formula for said crystal structure is formula $\alpha_a\beta_{(1-a)}$, a solubility $\alpha$ is $0<a<0.40$.

18. The image-display device according to claim 17, wherein in said phosphor in which the general formula is expressed by Zn(1–x) MxS: Ag, Al, an Ag density is in the range of 50 weight ppm<Ag<2000 weight ppm.

19. An image-display device according to claim 17, the image-display is a cathode-ray tube selected from the group consisting of color display tube and projection tube.

20. An image-display device according to claim 17, the device which is adapted to apply an electron beam to said phosphor layer, is an electron source selected from the group consisting of MIM type electron source and FED type electron source.

21. The image-display device according to claim 17, wherein said crystal structure of ZnS phosphor is formed in a calcination process that occurs at a temperature within 950° C. and 1000° C.

* * * * *